United States Patent
Smith (10) Patent No.: US 8,850,345 B1
(45) Date of Patent: Sep. 30, 2014

(54) METHOD FOR INTERACTING WITH A SYSTEM THAT INCLUDES PHYSICAL DEVICES INTERFACED WITH COMPUTER SOFTWARE

(75) Inventor: Randall B. Smith, Palo Alto, CA (US)

(73) Assignee: Oracle America, Inc., Redwood City, CA (US)

( * ) Notice: Subject to any disclaimer, the term of this patent is extended or adjusted under 35 U.S.C. 154(b) by 2891 days.

(21) Appl. No.: 10/846,430

(22) Filed: May 13, 2004

(51) Int. Cl.
*G06F 3/048* (2013.01)
*G06F 3/00* (2006.01)

(52) U.S. Cl.
USPC ........................................... 715/771; 715/740

(58) Field of Classification Search
CPC .................................. G06F 3/048; G06F 3/00
USPC .................................................. 715/771, 740
See application file for complete search history.

(56) References Cited

U.S. PATENT DOCUMENTS

| | | | | |
|---|---|---|---|---|
| 6,393,425 B1* | 5/2002 | Kelly | ................................... | 1/1 |
| 6,470,478 B1* | 10/2002 | Bargh et al. | ................... | 716/102 |
| 6,493,755 B1* | 12/2002 | Hansen et al. | ................. | 709/224 |
| 6,581,191 B1* | 6/2003 | Schubert et al. | ............. | 716/136 |
| 6,978,231 B2* | 12/2005 | Williams et al. | ................ | 703/14 |
| 7,002,702 B1* | 2/2006 | Machida | ....................... | 358/1.15 |
| 7,730,401 B2* | 6/2010 | Gillespie et al. | ............... | 715/702 |
| 2001/0011284 A1* | 8/2001 | Humpleman et al. | ......... | 707/511 |
| 2003/0075983 A1* | 4/2003 | Stecyk et al. | .................... | 307/38 |
| 2003/0101021 A1* | 5/2003 | Shah et al. | ..................... | 702/186 |
| 2003/0135355 A1* | 7/2003 | Wheeler et al. | .................. | 703/14 |
| 2003/0158927 A1* | 8/2003 | Sagey et al. | .................... | 709/223 |
| 2003/0202015 A1* | 10/2003 | Battles et al. | .................. | 345/764 |
| 2004/0075680 A1* | 4/2004 | Grace et al. | ................... | 345/734 |
| 2005/0039170 A1* | 2/2005 | Cifra et al. | ..................... | 717/125 |
| 2005/0198125 A1* | 9/2005 | Macleod Beck et al. | ...... | 709/204 |

* cited by examiner

*Primary Examiner* — Doon Chow
*Assistant Examiner* — Le Nguyen
(74) *Attorney, Agent, or Firm* — Martine Penilla Group, LLP (57) ABSTRACT

In a method for interacting with a system that includes physical devices that are interfaced with computer software, a graphical representation of a physical device that can be graphically interconnected with a graphical representation of a software module is generated. The graphical representation of the physical device is capable of being represented as either a graphical copy mode representation or a graphical ghost mode representation. On-screen interaction with functionality of the physical device is enabled when the graphical representation of the physical device is in the graphical copy mode representation. A true physical state of the physical device is tracked when the graphical representation of the physical device is in the graphical ghost mode representation. The tracking of the true physical state of the physical device disables on-screen interaction with functionality of the physical device. A dual-mode graphical user interface element for interfacing with a physical device also is described.

16 Claims, 5 Drawing Sheets

METHOD FOR INTERACTING WITH A SYSTEM THAT INCLUDES PHYSICAL DEVICES INTERFACED WITH COMPUTER SOFTWARE

BACKGROUND OF THE INVENTION

The present invention relates generally to computer systems and, more particularly, to a method for interacting with a system that includes physical devices interfaced with computer software.

A user who programs systems including physical devices that interface with computer software needs to test and debug various configurations of each system. Such systems typically include one or more physical devices, e.g., switches, sensors, or actuators, that communicate with a computer or a network of communicating computers. The creation, testing, and debugging of computer software is well known to those skilled in the art, but the emerging domain of mixed virtual/real objects is not as well studied.

One particular problem with systems including physical devices that interface with computer software is that the physical devices can be inconvenient to access. For example, the system may include a large number of physical devices scattered throughout a building. This makes the testing and debugging of various configurations of the system awkward and time consuming.

One technique that facilitates working with physical devices is to represent them on the screen as graphical user interface (GUI) elements. Thus, even if the physical devices are remote from the user, a physical device's virtual proxy can be seen on the screen. The use of virtual proxies for physical, i.e., real, devices poses a question regarding locus of control. If the virtual proxy is used to test the physical device, then the state of the virtual proxy no longer reflects the state of the physical device. Especially when the system includes complex physical devices that have multi-dimensional states, the use of a virtual proxy that allows on-screen interaction can cause the user to become quite confused as to the state of the physical device.

One approach to resolve the problem of representing the state of the physical device while enabling virtual interaction with the virtual proxy is to provide two on-screen GUI elements. The first GUI element is a literal proxy that does not allow on-screen interaction; the literal proxy always represents the state of the physical device. The second GUI element is a purely simulated GUI element that allows only on-screen interaction. The second GUI element starts out with a copy of the state of the physical device, but diverges from that state once the user starts to interact with it. In accordance with this approach, the user can use the second GUI element to test and debug the system, and, once satisfied, can disconnect the second GUI element and connect to the first GUI element to get the physical device into the system.

The use of two GUI elements is often satisfactory, but suffers from a number of disadvantages, especially when used in conjunction with more complex systems. First, it requires at least several GUI gestures to replace one GUI element with the other GUI element. This is time consuming and can become quite tedious if the number of connections to and from these GUI elements is large. The process of connecting and disconnecting the GUI elements also introduces the potential for confusion regarding the proper connections to be made. Second, the use of two GUI elements to represent a physical device requires more on-screen real estate. Third, from an aesthetic standpoint, the use of two GUI elements to represent a physical device prevents the on-screen representation of the physical device from looking like the actual physical device.

In view of the foregoing, there is a need for a method for interacting with a system that includes physical devices interfaced with computer software that enables the state of a physical device to be represented while allowing on-screen interaction with the proxy of the physical device.

SUMMARY OF THE INVENTION

Broadly speaking, the present invention fills this need by providing, among other things, a dual-mode graphical user interface element and accompanying methodology that enables a single object to represent both a virtual device and a physical device.

In accordance with one aspect of the present invention, a method for interacting with a system that includes physical devices that are interfaced with computer software is provided. In this method, a graphical representation of a physical device that can be graphically interconnected with a graphical representation of a software module is generated. The graphical representation of the physical device is capable of being represented as either a graphical copy mode representation or a graphical ghost mode representation. On-screen interaction with functionality of the physical device is enabled when the graphical representation of the physical device is in the graphical copy mode representation. A true physical state of the physical device is tracked when the graphical representation of the physical device is in the graphical ghost mode representation. The tracking of the true physical state of the physical device disables on-screen interaction with functionality of the physical device.

In one embodiment, the method for interacting with a system that includes physical devices that are interfaced with computer software further includes switching the graphical representation of the physical device between the graphical copy mode representation and the graphical ghost mode representation based on a user interaction. In one embodiment, the user interaction is provided using a pull down menu, a popup menu, or a mouse click.

In one embodiment, the graphical representation of the physical device in the graphical copy mode representation is rendered in manner that is different from the manner in which the graphical representation of the physical device in the graphical ghost mode representation is rendered. In one embodiment, the graphical representation of the physical device in the graphical copy mode representation is rendered as opaque and the graphical representation of the physical device in the graphical ghost mode representation is rendered as translucent.

In one embodiment, the method for interacting with a system that includes physical devices that are interfaced with computer software further includes defining a graphical representation of a software module. In one embodiment, the software module provides functional processing of an input or inputs from the graphical representation of the physical device.

In accordance with another aspect of the present invention, a dual-mode graphical user interface element for interfacing with a physical device is provided. The dual-mode graphical user interface element includes a graphical copy mode representation of a physical device that enables on-screen interaction with functionality of the physical device, and a graphical ghost mode representation of the physical device that tracks a true physical state of the physical device. The tracking of the true physical state of the physical device disables on-screen interaction with functionality of the physical device.

In one embodiment, the dual-mode graphical user interface element for interfacing with a physical device is switched between the graphical copy mode representation of the physical device and the graphical ghost mode representation of the physical device based on a user interaction. In one embodiment, the user interaction is provided using a pull down menu, a popup menu, or a mouse click.

In one embodiment, the graphical copy mode representation of the physical device is rendered in a manner that is different from the manner in which the graphical ghost mode representation of the physical device is rendered. In one embodiment, the graphical copy mode representation of the physical device is rendered as opaque and the graphical ghost mode representation of the physical device is rendered as translucent. In one embodiment, the graphical copy mode representation of the physical device includes a graphical representation of the true state of the physical device.

In accordance with a further aspect of the present invention, a computer readable medium containing program instructions for interacting with a system that includes physical devices that are interfaced with computer software is provided. The computer readable medium includes program instructions for generating a graphical representation of a physical device that can be graphically interconnected with a graphical representation of a software module, with the graphical representation of the physical device capable of being represented as either a graphical copy mode representation or a graphical ghost mode representation. The computer readable medium also includes program instructions for enabling on-screen interaction with functionality of the physical device when the graphical representation of the physical device is in the graphical copy mode representation. The computer readable medium further includes program instructions for tracking a true physical state of the physical device when the graphical representation of the physical device is in the graphical ghost mode representation, wherein the tracking of the true physical state of the physical device disables on-screen interaction with functionality of the physical device.

In accordance with a still further aspect of the present invention, a computer readable medium containing program instructions for providing a dual-mode graphical user interface element for interfacing with a physical device is provided. The computer readable medium includes program instructions for providing a graphical copy mode representation of a physical device that enables on-screen interaction with functionality of the physical device. The computer readable medium also includes program instructions for providing a graphical ghost mode representation of the physical device that tracks a true physical state of the physical device, wherein the tracking of the true physical state of the physical device disables on-screen interaction with functionality of the physical device.

It is to be understood that the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION

Several exemplary embodiments of the invention will now be described in detail with reference to the accompanying drawings.

Figure 1:
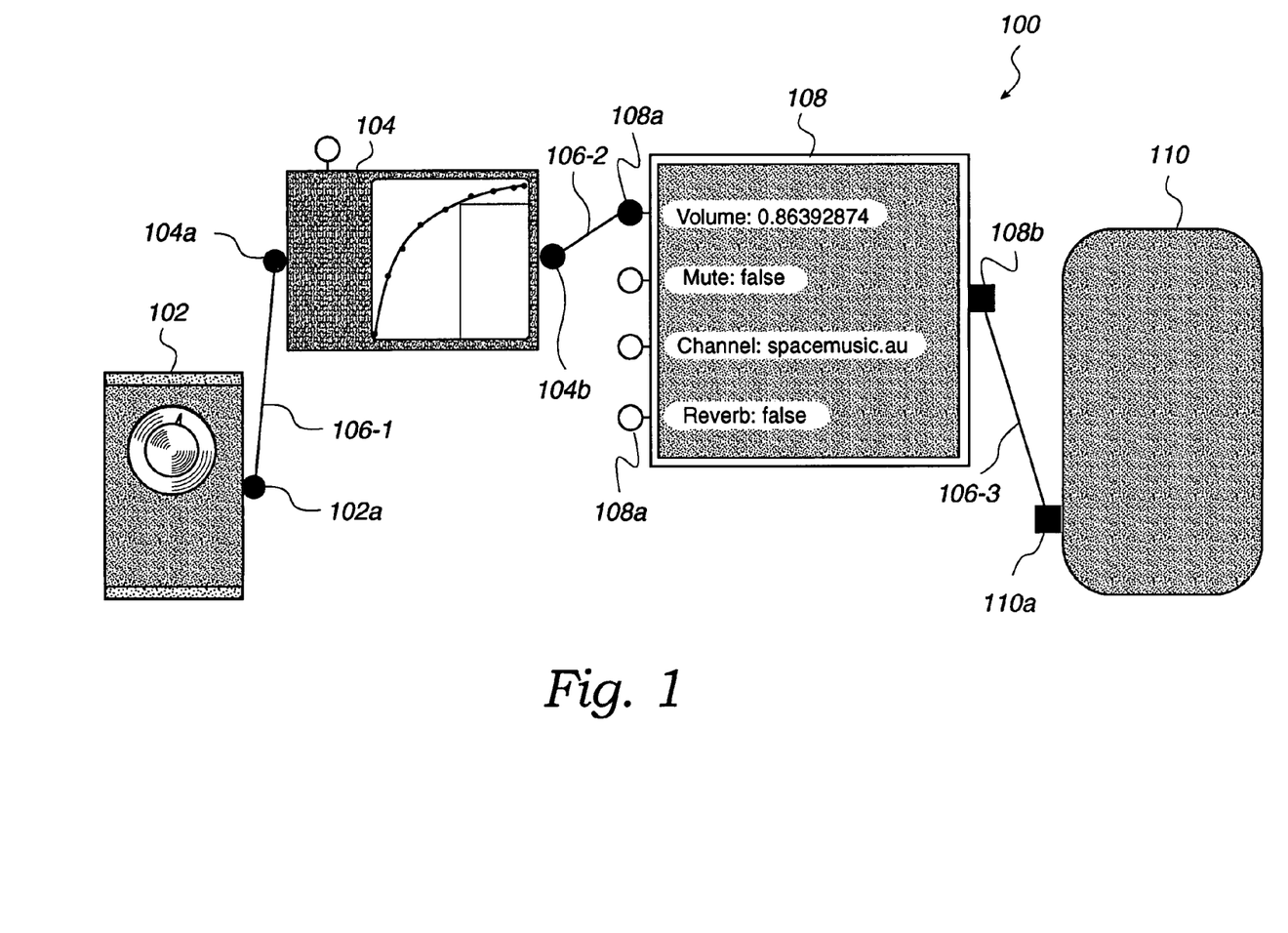
FIG. 1 is a screen shot of a system that includes virtual devices that represent physical devices that interface with computer software in accordance with one embodiment of the invention.

FIG. 1 is a screen shot of a system that includes virtual devices that represent physical devices that interface with computer software in accordance with one embodiment of the invention. As shown in FIG. 1, system 100 includes a dual-mode graphical representation 102, which depicts a real volume control knob that interfaces with the system. Additional details regarding the dual-mode nature of the graphical representation 102 of the knob will be explained below. The graphical representation 102 of the knob is connected to software component 104, which operates on the output from the knob. In this example, software component 104 allows the user to fine tune the sensitivity of the volume control knob. The connection between the graphical representation 102 of the knob and software component 104 is achieved using a virtual wire 106-1, which extends from output connector 102a of the graphical representation 102 of the knob 102 to input connector 104a of software component 104. Software component 104 is connected to virtual radio 108 by virtual wire 106-2, which extends from output connector 104b of software component 104 to one of the input connectors 108a of virtual radio 108. The output of virtual radio 108 drives a real speaker, which interfaces with system 100 and is represented on the screen as graphical representation 110. Virtual radio 108 is connected to graphical representation 110 of the speaker by virtual wire 106-3, which extends from output connector 108b of virtual radio 108 to input connector 110a of graphical representation 110 of the speaker.

Figure 2A:
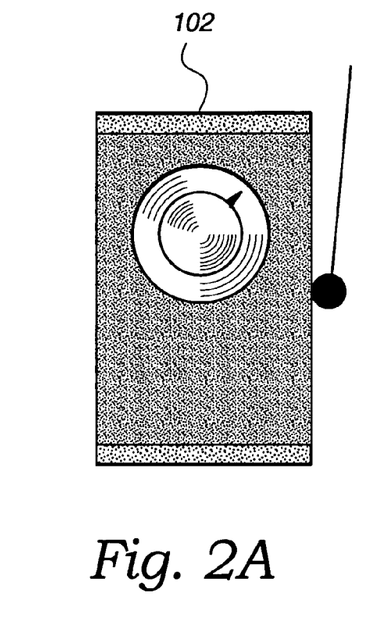
FIGS. 2A-2C are partial screen shots that illustrate the dual-mode nature of graphical representation 102 of the volume control knob shown in FIG. 1 in accordance with one embodiment of the invention.
Figure 2B:
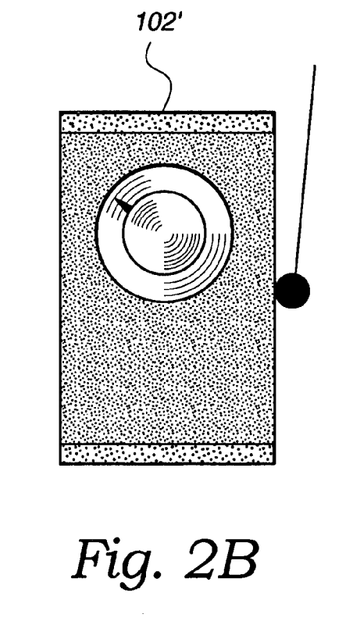
Figure 2C:
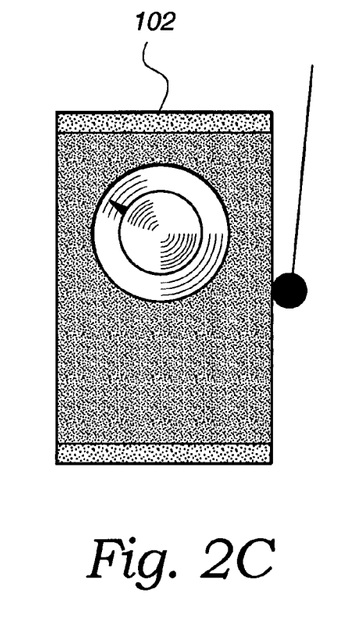

FIGS. 2A-2C are partial screen shots that illustrate the dual-mode nature of graphical representation 102 of the volume control knob shown in FIG. 1 in accordance with one embodiment of the invention. As shown in FIG. 2A, the graphical representation 102 of the volume control knob is in the graphical copy mode. In this mode, on-screen interaction with functionality of the physical device is enabled. In this example, the setting of the volume control knob has been changed (compare the position of the knob shown in FIG. 1 with that shown in FIG. 2A). As shown in FIG. 2B, the graphical representation 102' of the volume control knob is in the graphical ghost mode. In this mode, the state of the physical device is tracked and on-screen interaction with functionality of the physical device is disabled. The mode switch can be caused by any suitable user interaction. In one embodiment, the user interaction is a special mouse click, e.g., a right mouse click or a middle mouse click, on the graphical representation of the physical device. Alternatively, and by way of further non-limiting example, the user interaction can be provided using a pull down menu or a pop up menu. As shown in FIG. 2C, the graphical representation 102 of the volume control knob is back in the graphical copy mode. When the user switches from the graphical ghost mode to the graphical copy mode, the state of the physical device is copied to the graphical representation 102 of the volume control knob (note that the position of the knob shown in FIG. 2B is the same as that shown in FIG. 2C). Changes to the physical device are not tracked in graphical copy mode in the embodiment illustrated in FIGS. 2A-2C (an alternative embodiment in which changes to the physical device are tracked in graphical copy mode is described below with reference to FIG. 6). Thus, if the state of the physical device changes or the user makes on-screen changes to the graphical representation of the physical device, then the graphical copy mode representation of the physical device will not reflect the true state of the physical device.

To enable the user to distinguish between the graphical copy mode representation of the physical device and the graphical ghost mode representation of the physical device, the manner in which the graphical copy mode representation is rendered should be different from the manner in which the graphical ghost mode representation is rendered. As shown in FIGS. 1, 2A, and 2C, the graphical representation 102 of the volume control knob is rendered as opaque in the graphical copy mode. As shown in FIG. 2B, the graphical representation 102' of the volume control knob is rendered as translucent in the graphical ghost mode. The translucent rendering of the graphical ghost mode representation shown in FIG. 2B is exemplary, and it will be apparent to those skilled in the art that any suitable rendering that is different than that used for the graphical copy mode representation may be used for the graphical ghost mode representation. By way of non-limiting example, the graphical ghost mode representation may be rendered different from the graphical copy mode representation by using a different color, by providing shading, by using an outline representation, or by providing a blinking effect.

Figure 3:
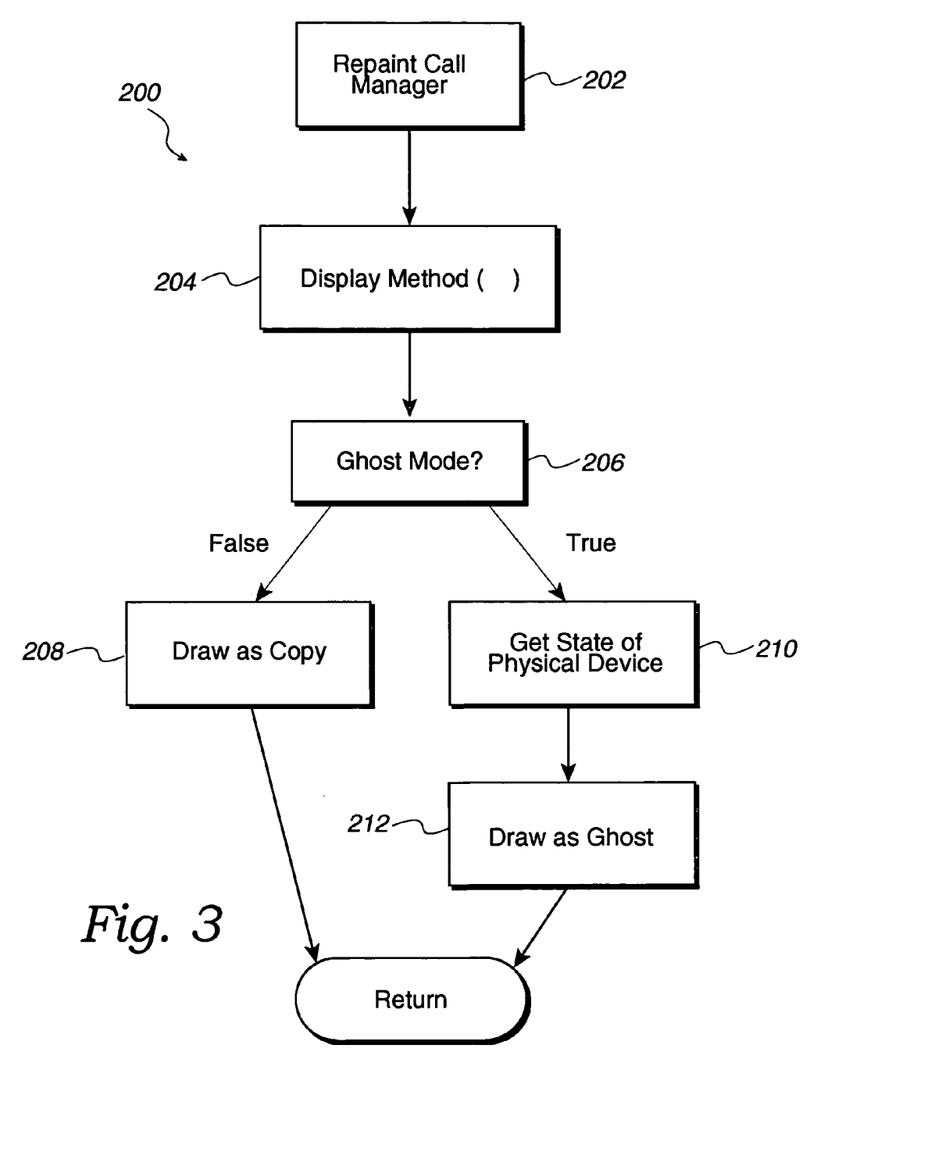
FIG. 3 is block diagram that illustrates the functions performed when an object used to represent a virtual device and a physical device needs to be updated in accordance with one embodiment of the invention.

FIG. 3 is block diagram 200 that illustrates the functions performed when an object used to represent a virtual device and a physical device needs to be updated in accordance with one embodiment of the invention. In block 202, a repaint call manager issues a call for a repaint operation. In block 204, a display method receives the call from the repaint call manager. In block 206, a determination is made as to whether the object to be updated is in the graphical ghost mode. If the object to be updated is not in the graphical ghost mode, then the object is drawn in graphical copy mode as shown in block 208, and control is returned to the controlling application. If the object to be updated is in the graphical ghost mode, then the state of the physical device is obtained in block 210. The state of the physical device may be obtained by an appropriate method that communicates with the physical device. Alternatively, the state of the physical device may be cached, in which case it would not be necessary to invoke the method that communicates with the physical device. Once the state of the physical device is obtained, the object is drawn in graphical ghost mode as shown in block 212, and control is returned to the controlling application. The controlling application may be the application that enables the graphical interaction with the system, and such controlling application would use the graphical copy/ghost embodiments of the present invention.

Figure 4:
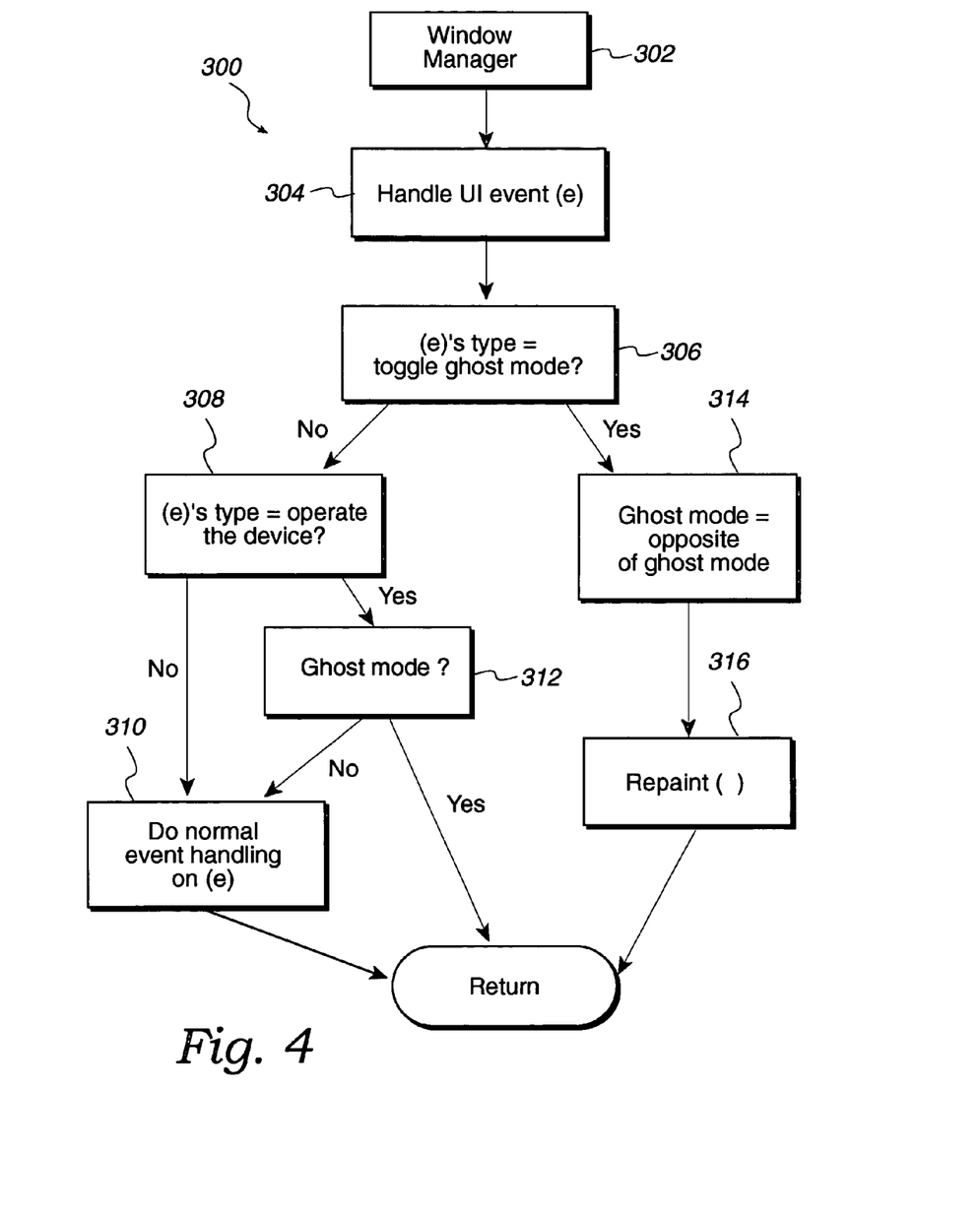
FIG. 4 is a block diagram that illustrates the functions performed in response to a user interface event in accordance with one embodiment of the invention.

FIG. 4 is a block diagram 300 that illustrates the functions performed in response to a user interface event in accordance with one embodiment of the invention. In block 302, a call is issued by, e.g., a window manager, in response to a user interface event (e). In block 304, the call is received by a method that will handle the user interface event (e). In block 306, a determination is made as to whether event (e)'s type calls for ghost mode to be toggled. If event (e)'s type does not call for ghost mode to be toggled, then, as shown in block 308, a determination is made as to whether event (e)'s type operates the physical device. If event (e)'s type does not operate the physical device, then normal event handling occurs on event (e) as shown in block 310. Examples of event types that do not operate the physical device include dragging, moving, and resizing the object on the screen. The normal event handling on event (e) will typically end with the object being repainted. Once the normal event handling on event (e) has ended, control is returned to the controlling application. On the other hand, if it determined in block 308 that event (e)'s type operates the physical device, then a determination is made in block 312 as to whether the object representing the physical device is in the graphical ghost mode. If the object representing the physical device is not in the graphical ghost mode, then normal event handling occurs on event (e) as shown in block 310. On the other hand, if it is determined in block 312 that the object representing the physical device is in the graphical ghost mode, then the functional operation calling for operation of the physical device is ignored, and control is returned to the controlling application. If desired, the user may be signaled, e.g., with a beep, when an attempt to operate the physical device is made while the object representing the physical device is in the graphical ghost mode.

Returning to block 306, if it is determined that event (e)'s type calls for ghost mode to be toggled, then, in block 314, the ghost mode variable is made equal to the opposite of what it was, i.e., true is changed to false, and false is changed to true. In block 316, the object is repainted in the new mode. In other word, if the object was in the graphical copy mode, then the object is repainted in the graphical ghost mode, and vice versa. The repaint operation may be performed by executing the functions shown in FIG. 3. Once the object is repainted in block 316, control is returned to the controlling application.

Figure 5:
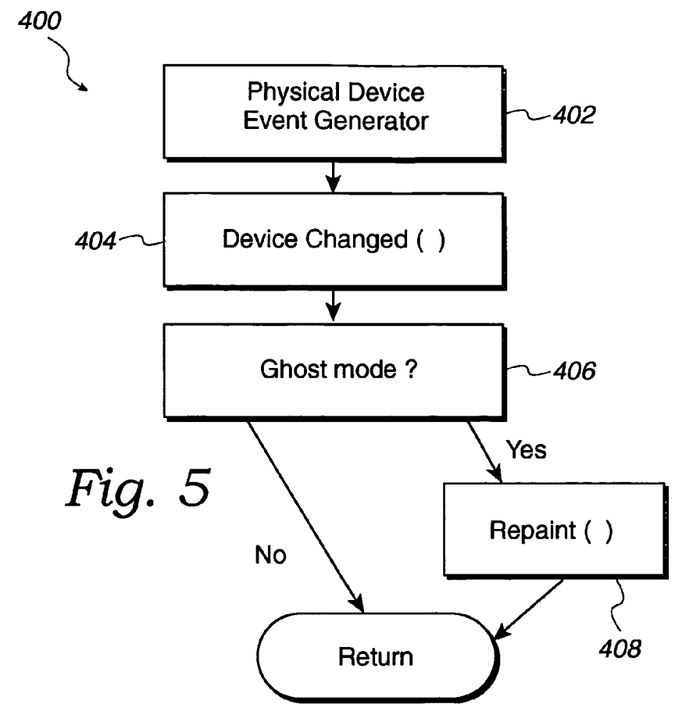
FIG. 5 is a block diagram that illustrates the functions performed to keep an object represented in the graphical ghost mode updated when changes to the physical device occur, in accordance with one embodiment of the invention.

FIG. 5 is a block diagram 400 that illustrates the functions performed to keep an object represented in the graphical ghost mode updated when changes to the physical device occur, in accordance with one embodiment of the invention. In block 402, a physical device event generator detects that a physical device has been changed and issues a call in response thereto. In block 404, a device changed method receives the call from the physical device generator. In block 406, a determination is made as to whether the object that represents the physical device is in the graphical ghost mode. If it is determined that the object that represents the physical device is not in the graphical ghost mode, then the device changed method is not responsible for updating the object (because in this exemplary embodiment the state of the physical device is not shown when the object is in the graphical copy mode), and control is returned to the controlling application. On the other hand, if it is determined that the object is in the graphical ghost mode, then the object is repainted as shown in block 408. The repaint operation may be performed by executing the functions shown in FIG. 3. Once the object is repainted in block 408, control is returned to the controlling application.

Figure 6:
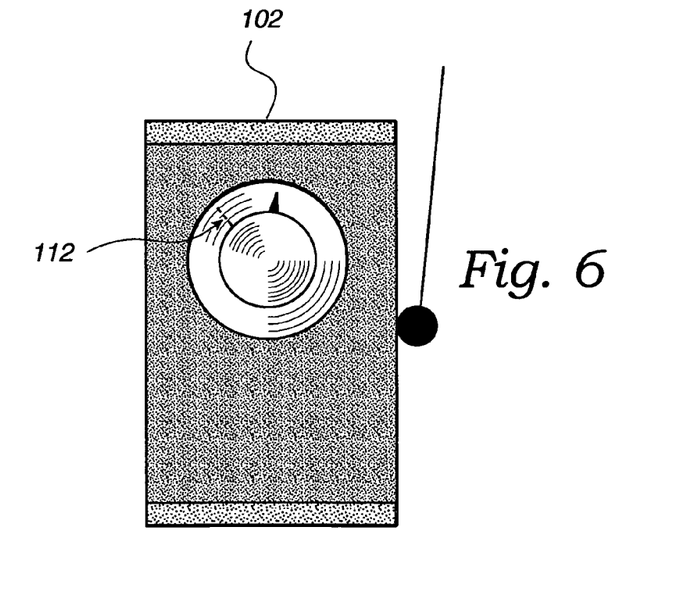
FIG. 6 is a partial screen shot of graphical representation 102 of the volume control knob shown in FIG. 1 in which the state of the physical device is shown in the graphical copy mode, in accordance with one embodiment of the invention.

In the exemplary embodiments described above and shown in FIGS. 1-5, the state of the physical device is not shown when the object representing the physical device is in the graphical copy mode. If desired, however, the state of the physical device can always be shown on the object, even when the object is represented in the graphical copy mode. FIG. 6 is a partial screen shot of graphical representation 102 of the volume control knob shown in FIG. 1 in which the state of the physical device is shown in the graphical copy mode, in accordance with one embodiment of the invention. As shown in FIG. 6, the state of the physical device is indicated by the dotted line indicated by reference number 112. In one embodiment, the dotted line is rendered as a grayed out representation to further distinguish the state of the physical device from the state shown in the graphical copy mode. It will be apparent to those skilled in the art that any rendering scheme that enables the state of the physical device to be distinguished from the state shown in the graphical copy mode may be used. To implement the inclusion of the state of the physical device in both modes, the functions set forth in the block diagrams shown in FIGS. 3-5 would have to be adjusted to account for the inclusion of the state of the physical device when the object is represented in the graphical copy mode. Upon reviewing this disclosure, those skilled in the art would be capable of adjusting the functions set forth in the block diagrams shown in FIGS. 3-5 so that the state of the physical device is shown at all times, i.e., both when the object is represented in the graphical ghost mode and also when the object is represented in the graphical copy mode.

The method for interacting with a system that includes physical devices interfaced with computer software has been described herein in the context of a relatively simple example in which the physical devices include a volume control knob and a speaker. It will be apparent to those skilled in the art that the method is applicable to any system that includes physical devices interfaced with computer software. By way of non-limiting example, the physical devices may be switches (e.g., light switches), controls to electrical or mechanical devices, sensors (e.g., temperature sensors used in heating, ventilation, and air conditioning (HVAC) systems), or actuators that trigger on/off states.

Those skilled in the art will recognize that the order in which the method operations are performed may be varied from that described herein, e.g., by rearranging the order in which the method operations are performed or by performing some of the method operations in parallel. In addition, the present invention may be practiced with other computer system configurations including hand-held devices, microprocessor systems, microprocessor-based or programmable consumer electronics, minicomputers, mainframe computers, and the like.

With the embodiments described herein in mind, it should be understood that the present invention may employ various computer-implemented operations involving data stored in computer systems. These operations are those requiring physical manipulation of physical quantities. These quantities usually, but not necessarily, take the form of electrical or magnetic signals capable of being stored, transferred, combined, compared, and otherwise manipulated. Further, the manipulations performed are often referred to using terms such as producing, identifying, determining, or comparing.

Any of the operations described herein that form part of the present invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The present invention also can be embodied as computer readable code on a computer readable medium. The computer readable medium may be any data storage device that can store data which can be thereafter be read by a computer system. Examples of the computer readable medium include hard drives, network attached storage (NAS), read-only memory, random access memory, CD-ROMs, CD-Rs, CD-RWs, magnetic tapes, and other optical and non-optical data storage devices. The computer readable medium also can be distributed over network coupled computer systems so that the computer readable code is stored and executed in a distributed fashion.

In summary, the present invention provides a method for interacting with a system that includes physical devices interfaced with computer software. The invention has been described herein in terms of several exemplary embodiments. Other embodiments of the invention will be apparent to those skilled in the art from consideration of the specification and practice of the invention. The embodiments and preferred features described above should be considered exemplary, with the invention being defined by the appended claims and equivalents thereof.

What is claimed is:

1. A method for interacting with a system that includes physical devices that are interfaced with computer software, comprising:

generating a graphical representation of a physical device that is connected by a virtual wire to a graphical representation of a software module, the graphical representation of the physical device capable of being represented as either a graphical copy mode representation or a graphical ghost mode representation;

enabling on-screen interaction with the graphical copy mode representation to change a setting of the physical device and provide the changed setting as an input to the software module, whereby the software module operates to test and debug the system based on the changed setting received as the input by way of the interaction with the graphical copy mode representation when the graphical representation of the physical device is in the graphical copy mode representation, the on-screen interaction causing a change in a visual appearance of the graphical representation of the physical device so as to visually indicate the changed setting provided as the input; and tracking a true physical state and a true setting of the physical device when the graphical representation of the physical device is in the graphical ghost mode representation, the true physical state and the true setting of the physical device being graphically displayed in the graphical ghost mode representation, wherein tracking of the true physical state and the true setting of the physical device disables on-screen interaction with functionality of the physical device as enabled with the graphical copy mode representation, thereby maintaining the true physical state and the true setting of the physical device during testing and debugging of the system using the software module.

2. A method for interacting with a system that includes physical devices that are interfaced with computer software as recited in claim 1, further comprising:

switching the graphical representation of the physical device between the graphical copy mode representation and the graphical ghost mode representation based on a user interaction.

3. A method for interacting with a system that includes physical devices that are interfaced with computer software as recited in claim 2, wherein the user interaction is provided using a pull down menu, a popup menu, or a mouse click.

4. A method for interacting with a system that includes physical devices that are interfaced with computer software as recited in claim 1, wherein the graphical representation of the physical device in the graphical copy mode representation is rendered in a first manner and the graphical representation of the physical device in the graphical ghost mode representation is rendered in a second manner, the second manner being different from the first manner.

5. A method for interacting with a system that includes physical devices that are interfaced with computer software as recited in claim 1, wherein the graphical representation of the physical device in the graphical copy mode representation is rendered as opaque and the graphical representation of the physical device in the graphical ghost mode representation is rendered as translucent.

6. A method for interacting with a system that includes physical devices that are interfaced with computer software, comprising:
    defining a graphical representation of a software module;
    generating a graphical representation of a physical device that is connected by a virtual wire to the graphical representation of the software module, the graphical representation of the physical device capable of being represented as either a graphical copy mode representation or a graphical ghost mode representation;
    enabling on-screen interaction with the graphical copy mode representation to change a setting of the physical device and provide the changed setting as an input to the software module, whereby the software module operates to test and debug the system based on the changed setting received as an input by way of the interaction with the graphical copy mode representation when the graphical representation of the physical device is in the graphical copy mode representation, the on-screen interaction causing a change in a visual appearance of the graphical representation of the physical device so as to visually indicate the changed setting provided as the input; and
    tracking a true physical state and a true setting of the physical device when the graphical representation of the physical device is in the graphical ghost mode representation, the true physical state and the true setting of the physical device being graphically displayed in the graphical ghost mode representation, wherein tracking of the true physical state and the true setting of the physical device disables on-screen interaction with functionality of the physical device as enabled with the graphical copy mode representation, thereby maintaining the true physical state and the true setting of the physical device during testing and debugging of the system using the software module.

7. A method for interacting with a system that includes physical devices that are interfaced with computer software as recited in claim 6, further comprising:
    switching the graphical representation of the physical device between the graphical copy mode representation and the graphical ghost mode representation based on a user interaction.

8. A method for interacting with a system that includes physical devices that are interfaced with computer software as recited in claim 7, wherein the user interaction is provided using a pull down menu, a popup menu, or a mouse click.

9. A method for interacting with a system that includes physical devices that are interfaced with computer software as recited in claim 6, wherein the graphical representation of the physical device in the graphical copy mode representation is rendered in a first manner and the graphical representation of the physical device in the graphical ghost mode representation is rendered in a second manner, the second manner being different from the first manner.

10. A method for interacting with a system that includes physical devices that are interfaced with computer software as recited in claim 6, wherein the graphical representation of the physical device in the graphical copy mode representation is rendered as opaque and the graphical representation of the physical device in the graphical ghost mode representation is rendered as translucent.

11. A method for interacting with a system that includes physical devices that are interfaced with computer software as recited in claim 6, wherein the software module provides functional processing of an input or inputs from the graphical representation of the physical device.

12. A non-transitory computer readable medium containing program instructions for interacting with a system that includes physical devices that are interfaced with computer software, comprising:
    program instructions for generating a graphical representation of a physical device that is connected by a virtual wire to a graphical representation of a software module, the graphical representation of the physical device capable of being represented as either a graphical copy mode representation or a graphical ghost mode representation;
    program instructions for enabling on-screen interaction with the graphical copy mode representation to change a setting of the physical device and provide the changed setting as an input to the software module, whereby the software module operates to test and debug the system based on the changed setting received as the input by way of the interaction with the graphical copy mode representation when the graphical representation of the physical device is in the graphical copy mode representation, the on-screen interaction causing a change in a visual appearance of the graphical representation of the physical device so as to visually indicate the changed setting provided as the input; and
    program instructions for tracking a true physical state and a true setting of the physical device when the graphical representation of the physical device is in the graphical ghost mode representation, the true physical state and the true setting of the physical device being graphically displayed with the setting in the graphical ghost mode representation, wherein tracking of the true physical state and the true setting of the physical device disables on-screen interaction with functionality of the physical device as enabled with the graphical copy mode representation, thereby maintaining the true physical state and the true setting of the physical device during testing and debugging of the system using the software module.

13. A non-transitory computer readable medium containing program instructions for interacting with a system that includes physical devices that are interfaced with computer software as recited in claim 12, further comprising:
    program instructions for switching the graphical representation of the physical device between the graphical copy mode representation and the graphical ghost mode representation based on a user interaction.

14. A non-transitory computer readable medium containing program instructions for interacting with a system that includes physical devices that are interfaced with computer software as recited in claim 13, wherein the user interaction is provided using a pull down menu, a popup menu, or a mouse click.

15. A non-transitory computer readable medium containing program instructions for interacting with a system that includes physical devices that are interfaced with computer software as recited in claim 12, wherein the graphical representation of the physical device in the graphical copy mode representation is rendered in a first manner and the graphical representation of the physical device in the graphical ghost mode representation is rendered in a second manner, the second manner being different from the first manner.

16. A non-transitory computer readable medium containing program instructions for interacting with a system that includes physical devices that are interfaced with computer software as recited in claim 12, wherein the graphical representation of the physical device in the graphical copy mode representation is rendered as opaque and the graphical representation of the physical device in the graphical ghost mode representation is rendered as translucent.

* * * * *